H. H. BOYCE.
MOUNTING FOR TEMPERATURE RESPONSIVE ELEMENTS.
APPLICATION FILED FEB. 27, 1918.
1,326,176.  Patented Dec. 30, 1919.
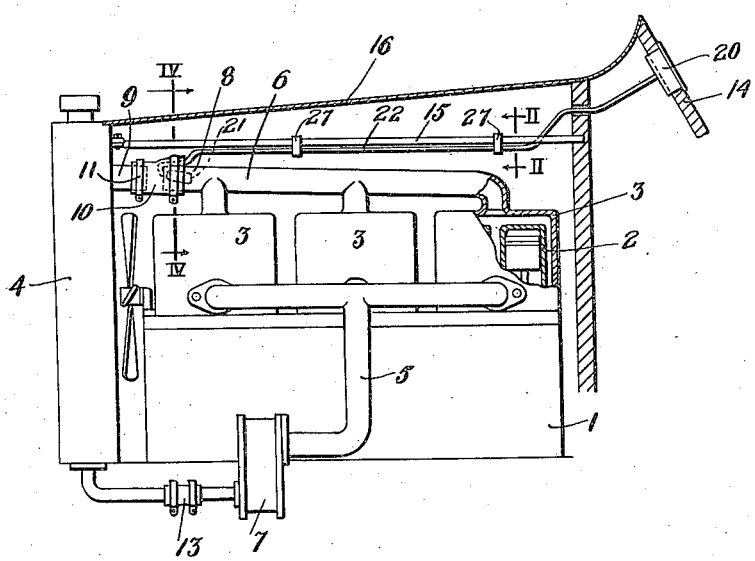
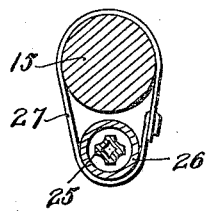
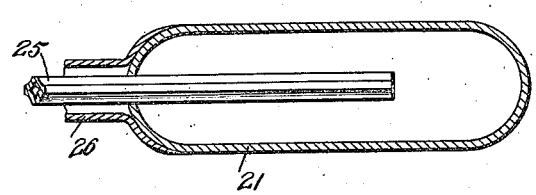
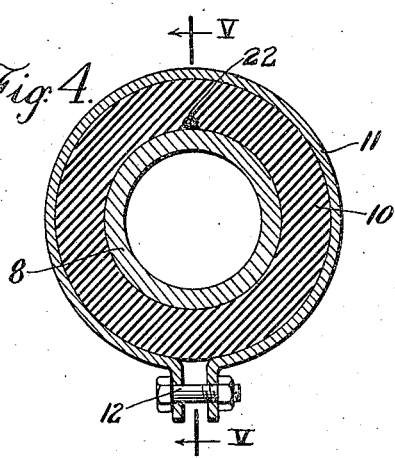
INVENTOR
Harrison H. Boyce
BY
Edward Quincy Moore
his ATTORNEY

UNITED STATES PATENT OFFICE.

HARRISON H. BOYCE, OF FOREST HILLS, NEW YORK.

MOUNTING FOR TEMPERATURE-RESPONSIVE ELEMENTS.

1,326,176.  Specification of Letters Patent. Patented Dec. 30, 1919.

Application filed February 27, 1918. Serial No. 219,508.

*To all whom it may concern:*

Be it known that I, HARRISON H. BOYCE, a citizen of the United States, and a resident of Forest Hills, county of Queens, and State of New York, have invented certain new and useful Improvements in Mountings for Temperature-Responsive Elements, of which the following is a specification.

This invention relates to means for mounting temperature responsive elements in connection with vehicle propelling engines or in other similar situations and more particularly to the mounting of temperature responsive elements of temperature indicating devices employed for the measurement of temperatures in connection with the engines of automobiles, aeroplanes or other vehicles as set forth in my Patent No. 1,206,783. As disclosed in said patent, a temperature indicating system for internal combustion engines is provided, in which an indicating instrument is utilized, located on the dash board of the vehicle or in other convenient position for observation by the operator, this instrument being connected by a flexible connection to a temperature responsive element which is introduced into the cooling system of the vehicle engine in a suitable location preferably in the liquid at a point where it has reached its highest temperature, for instance, into the return pipe leading from the cylinder jackets to the radiator. The present invention provides for the convenient introduction of the temperature responsive element into the cooling system in such a manner as to avoid the necessity for boring holes in the cylinder jackets, piping, radiator or any other part of the system. By employing the present invention, no special mechanical construction of the engine or cooling system is required and no mechanical operations requiring skilled workmanship or introducing the possibility of injury to any part of the system or the formation of leaks have to be performed. The invention is also applicable to the mounting of the temperature responsive elements of thermostatic control devices.

In accordance with the present invention, I take advantage of features of construction usually present in engine cooling systems in such a way as to effect the desired result with the least possible disturbance or disarrangement of the parts. The nature of the invention and various specific objects thereof will appear from the following detailed description of one preferred embodiment of the invention, which I have chosen to illustrate the principle thereof and the best mode now known to me for performing the same.

In the accompanying drawings, Figure 1 is a diagrammatic view of the engine and cooling system of a motor vehicle having an indicating instrument applied thereto in accordance with the invention. Fig. 2 is an enlarged transverse section on line II—II of Fig. 1, showing a form of flexible connection between the indicating instrument and temperature responsive element which may be employed and also a supporting clamp therefor. Fig. 3 is a longitudinal section through a form of bulb which may be utilized as the temperature responsive element. Fig. 4 is an enlarged detailed section on line IV—IV of Fig. 1. Fig. 5 is a section on line V—V of Fig. 4.

Referring to the drawings in detail, the numeral 1 designates an automobile engine having a plurality of cylinders 2, the upper parts of which are inclosed in cooling jackets 3. 4 is a radiator which may be of any suitable type, connections being provided between the radiator and cooling jackets through which the cooling liquid is circulated to cool the engine cylinders in a well understood manner. As illustrated, the cooled liquid is introduced into the jackets through an inlet pipe 5, while the heated water returns from the jackets to the radiator through a return pipe 6. Circulation is maintained in any suitable manner as upon the principle of the thermosiphon system or by means of a pump illustrated diagrammatically at 7.

In vehicle construction, on account of the vibration of the engine and the possible relative movement of the parts, it is customary to mount the engine and radiator separately upon the vehicle frame and to provide flexible connections in the pipes connecting the engine and radiator which take care of any relative movement between these parts and prevent the vibration of the engine from being transmitted to the instrument. I have illustrated such a construction here where it is seen that the return pipe is formed in two sections 8 and 9, which are rigidly attached respectively to the engine and radiator and which are connected by a flexible section 10 usually formed of rubber hose. The section 10 is of slightly larger diameter than the pipe sections 8 and 9 over which its ends fit, the joints being maintained and rendered tight in any suitable manner, usually by the use of hose clamps 11 in the form of straps encircling the ends of the hose where such ends overlap the pipe sections. The straps are arranged to be tightened in place by suitable means such as the screw bolts 12. A similar flexible connection is illustrated at 13 in the inlet pipe. The vehicle dash is illustrated at 14, the radiator being braced in an upright position by means of a tie rod 15 extending over the top of the engine between the radiator and dash. The usual hood for inclosing the engine is illustrated at 16.

To illustrate the application of my invention to the cooling system, I have shown a temperature indicating instrument or thermometer of the distance type, which is provided with a suitable indicating device or gage 20 mounted in position for observation by the driver of the vehicle, as upon the vehicle dash 14. This instrument is of such a nature as to provide an indication upon the expansion or contraction of a body of fluid contained within a bulb 21, which constitutes the temperature responsive element of the instrument. Communication is established between the bulb and gage by means of a flexible tube 22 of small diameter.

The present invention is concerned particularly with the mode of introducing the bulb 21 or other temperature responsive element into the cooling system without the necessity for tapping the water jackets or piping of the cooling system, this result being accomplished by passing the flexible connecting tube 22 into the cooling system at the point where one of the rigid circulating pipe sections, such as the pipe section 8, is overlapped by the end of the flexible hose 10. This construction is possible by reason of the small diameter of the connecting member 22 and the yielding nature of the hose section 10 which permits the tube 22 to embed itself therein as illustrated diagrammatically on a somewhat enlarged scale in Fig. 4. The end of the hose section when clamped tightly around the pipe section 8 will compress itself closely around the tube 22 so as to form a tight joint from which there is substantially no danger of leakage. If necessary, a suitable cement or luting may be applied to the joint which will further eliminate the possibility of leakage.

With the construction described, it will be seen that introduction of the temperature responsive element into the circulation system may be accomplished by simply removing one of the hose clamps 11, slipping the end of the flexible hose off of the adjacent end of the pipe section, introducing the bulb into the pipe with the end of the tube 22 laid upon the outer surface of the pipe section and then replacing the end of the hose and drawing it tight around the pipe section and compressing it upon and around the tube by tightening up the clamp. The circulating system is thus restored to normal condition with the temperature responsive element therein, this result being accomplished without drilling any holes in any part of the circulating system, which might weaken the latter and tend to cause cracks and give opportunity for leakage. No machine work whatever is required. The invention is especially advantageous in obviating the drilling of holes in any part of the circulating system as the walls of the pipe sections and of the radiator are usually of quite thin metal and it is difficult to satisfactorily attach a stuffing box or other member for receiving the bulb or tube and producing a tight joint. The drilling of holes in the cylinder water jackets is also in most cases objectionable as these jackets are usually cast integral with the cylinders and there is danger of weakening the metal in such a way that the cylinders may crack. These objectionable results are entirely avoided by the present invention.

The connecting member 22 may be an ordinary tube of small diameter forming a fluid connection between the bulb and the gage or it may be of any other suitable flexible connection depending upon the nature of the temperature responsive element, such for instance as an electric wire. In the particular embodiment of the invention illustrated, I have shown the connection 22 as comprising a capillary tube inclosed in a protective or insulating casing, which forms a dead air space around the capillary tube so as to minimize the effect of external temperature conditions thereon. This construction is shown in Figs. 2 and 3, in which the capillary tube 25 is formed of star shaped section and is inclosed within the sleeve or jacket 26. The open end of the tube 25 projects into the bulb 21, while the end of the sleeve 26 is attached to the outside of the bulb. The particular construction of the capillary tube shown is not claimed herein, as the same is not my invention.

Another feature of the invention relates to the supporting of the tube 22 between its point of introduction into the cooling system and the gage 20. As illustrated, this is accomplished by attaching the tube to the tie rod 15 by suitable clamps 27 located at intervals along the tie rod.

While I have shown and described in detail one preferred embodiment of the invention, as illustrative of the principle thereof, the invention is capable of use in other forms and in other locations than that particularly set forth. I do not, therefore, desire to limit myself to the particular example of the invention disclosed but intend to cover my invention in whatever forms its principle is embodied.

Having thus described my invention, I claim:

1. The combination with the cooling system of an internal combustion engine, said system including means forming a passage for the cooling fluid, said passage-forming means having a joint therein, of a temperature responsive element within the cooling system and a connection from said temperature responsive element extending out of the system through said joint.

2. The combination with the cooling system of an internal combustion engine, said system including a conduit for the cooling fluid comprising a rigid section and a flexible hose section overlapping the end of the rigid section, of a temperature responsive element in said conduit having a connection extending out of the cooling system between the outer surface of the rigid conduit section and the inner surface of the flexible hose section where the latter overlaps the former.

3. The combination with the cooling system of an internal combustion engine, said system including a conduit for the cooling fluid comprising a rigid section, and a flexible hose section overlapping the end of the rigid section, of a temperature responsive element in said conduit having a connection extending out of the cooling system between the outer surface of the rigid conduit section and the inner surface of the flexible hose section where the latter overlaps the former, and a clamp for securing said hose section upon said rigid section and for compressing said hose section tightly around said connection from the temperature responsive element.

4. Means for establishing a temperature responsive connection with the interior of a conduit including a rigid section and a flexible section, comprising the combination with said rigid and flexible sections of a temperature responsive element within the conduit having a transmitting element of small diameter extending out of the conduit between the overlapping portions of the rigid and flexible sections.

5. Means for establishing a temperature responsive connection with the interior of a conduit including a rigid section and a flexible section, the end of the latter overlapping the end of the former, comprising the combination with said rigid and flexible sections, of a bulb in said conduit containing an expansible fluid, and a capillary tube extending from said bulb out of said conduit between the overlapping surfaces of said rigid and flexible sections.

6. In temperature indicating means for the cooling system of an internal combustion vehicle propelling engine, the combination of an engine cooling system including cylinder jackets, a radiator and a return pipe leading from said jackets to said radiator, said pipe including a rigid section and a flexible section overlapping the end of said rigid section, an indicating gage mounted in a position to be observed by the driver of the vehicle, a bulb containing an expansible fluid and located within the return pipe, and a capillary tube connecting said bulb and gage, said capillary tube extending out of said return pipe between the overlapping portions of the rigid and flexible sections thereof.

7. In temperature indicating means for the cooling system of an internal combustion vehicle-propelling engine, the combination of an engine cooling system including cylinder jackets, a radiator and a return pipe leading from said jackets to said radiator, said pipe including a rigid section and a flexible section overlapping the end of said rigid section, an indicating gage mounted in a position to be observed by the driver of the vehicle, a bulb containing an expansible fluid and located within the return pipe, a capillary tube inclosed in a protective and insulating sleeve connecting said bulb and gage, said tube extending out of said return pipe between the overlapping portions of said rigid and flexible pipe sections, and a clamping band surrounding the portion of said flexible pipe section which overlaps said rigid pipe section, said band clamping said sections together and compressing the flexible pipe section around said capillary tube and inclosing sleeve.

HARRISON H. BOYCE.